Aug. 8, 1939.  E. L. ROSE  2,168,655
POWER TRANSMISSION
Filed July 15, 1936  6 Sheets-Sheet 1

INVENTOR
EDWIN L. ROSE
BY
Ralph L. Tweedale
ATTORNEY

Aug. 8, 1939.　　　　E. L. ROSE　　　　2,168,655
POWER TRANSMISSION
Filed July 15, 1936　　　　6 Sheets-Sheet 2

INVENTOR
EDWIN L. ROSE
BY
Ralph L. Twesdale
ATTORNEY

Aug. 8, 1939.  E. L. ROSE  2,168,655

POWER TRANSMISSION

Filed July 15, 1936  6 Sheets-Sheet 5

INVENTOR
EDWIN L. ROSE
BY
ATTORNEY

Aug. 8, 1939.  E. L. ROSE  2,168,655
POWER TRANSMISSION
Filed July 15, 1936  6 Sheets-Sheet 6
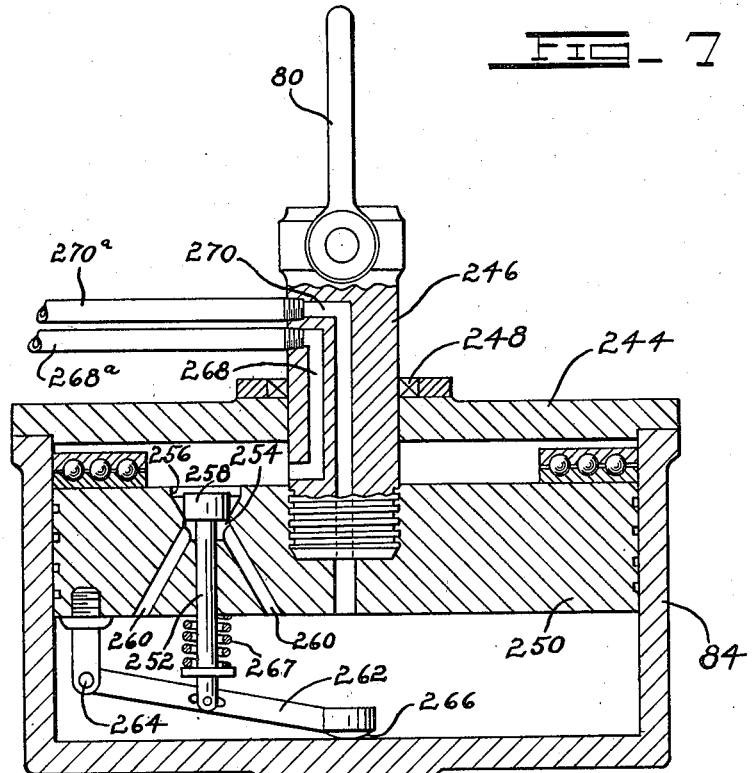
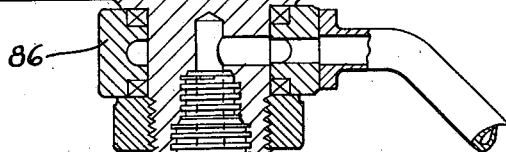
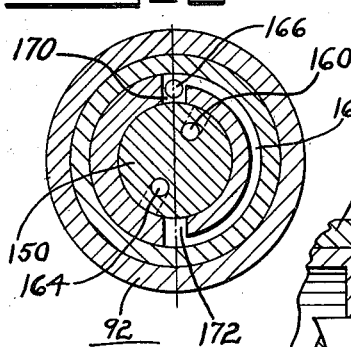
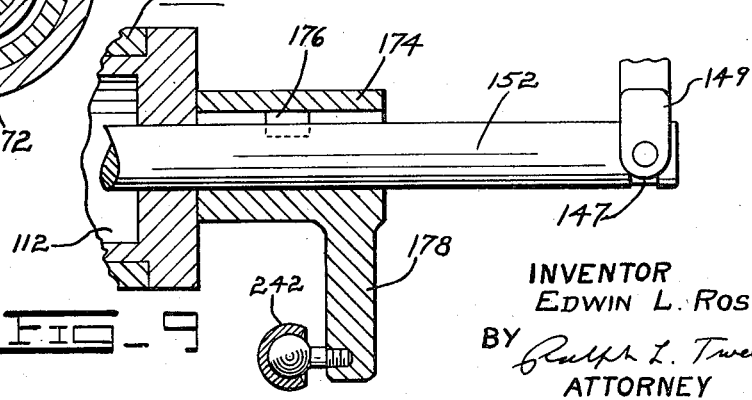
INVENTOR
EDWIN L. ROSE
BY Ralph L. Tweedale
ATTORNEY Patented Aug. 8, 1939

2,168,655

UNITED STATES PATENT OFFICE 2,168,655

POWER TRANSMISSION

Edwin L. Rose, Waterbury, Conn., assignor to The Waterbury Tool Company, Waterbury, Conn., a corporation of Connecticut Application July 15, 1936, Serial No. 90,785

11 Claims. (Cl. 255—23)

This invention relates to power transmissions and particularly to transmissions of the hydraulic type comprising a fluid pump and fluid motor either or both of which may be provided with mechanism for varying its displacement in order to vary the speed ratio between the prime mover which operates the pump and the load device which the motor operates. The invention is illustrated as adapted for use in a well drilling rig of well-known type in which a string of drill stem is caused to revolve by a rotary drilling head while a portion of the weight of the string rests upon the earth formation at the bottom of the hole being drilled, the remainder being suspended on a block and falls mounted in a drilling derrick and connected to a draw-works drum.

It is desirable in such drilling operations to maintain at a constant value that portion of the weight of drill string which rests upon the earth formation at the bottom of the hole and to be able to readily adjust such weight to different values as different formations are encountered. Various automatic control devices have been proposed for regulating the weight on the drill stem, many of which have been unsatisfactory, due to lack of sensitivity in their regulation. Some forms of automatic regulation utilize mechanism which is responsive to variations in tension in either the live or the dead end of the cable, which supports the drill string through the block and falls. Such devices may not be made sensitive to the degree required since the friction of the sheaves introduces a damping effect which in some instances may be as high as 25% of the suspended weight. Such a device therefore can respond only to changes in suspended weight which are greater in magnitude than the frictional damping effect between the drill string stem and the weight sensitive device.

In earth boring operations of this general class it is necessary from time to time as the work progresses to retract the drill stem from the hole for the purpose of replacing the cutting bit at the lower end of the drill stem. In so doing it is necessary to stop the rotational movement of the drill stem and hoist the stem a suitable distance to near the top of the derrick, this distance usually being 90 feet, and to grip the stem at the rotary table and remove the section of the drill stem projecting above the table. The hoisting apparatus is then lowered and connected to the remaining portion of the stem projecting from the rotary table and hoisted another 90 feet and the operation is repeated until the entire string is removed from the hole. After necessary repairs to the bit are made, by reversing this process the bit may be again brought to working position at the bottom of the hole.

In many drilling operations of this nature it is of prime importance that the hole be cut down to its intended depth in the least possible total lapsed time. Inasmuch as normal drilling operations are suspended while the drill string is being retracted and replaced for repair purposes, it is essential to keep the time consumed for this purpose to a minimum and it is customary to provide prime movers of several times the power output required for drilling operations so that the string may be retracted at a maximum speed and lost time reduced to a minimum. It will be seen that in retracting the string the weight of the string and the load to be lifted is progressively reduced as each section of drill stem is detached from the sections below it so that at each hoist of 90 feet the load to be hoisted is reduced by the weight of one 90-foot section of drill stem.

For a given maximum horsepower of the prime mover and a given weight of drill string there is only one speed ratio between the prime mover and the draw-works drum which will permit the string to be retracted at a speed which utilizes the full power of the prime mover. It is obviously impractical to provide direct mechanical gearing between the prime mover and the draw-works drum with sufficient speed ratios to permit full power hoisting of the stem at each 90-foot hoist. In drilling rigs in general use heretofore variable speed chains and sprockets or spur gearing have been provided with usually 4 or 6 available speed ratios and the operator has selected the highest drive ratio which will permit the prime mover to hoist the stem without stalling. With this construction it is necessary to use one speed ratio for a considerable number of consecutive hoists of the drill stem before the drill stem weight is reduced sufficiently to enable the operator to shift to the next higher ratio. It will be seen that with this method of operation the speed of hoisting is the same for several consecutive hoists of the drill stem and inasmuch as the weight of the stem is reduced at each hoist, the full power of the prime mover can be utilized only on the first hoist at a given ratio and that thereafter the power load on the prime mover progressively decreases.

It is an object of the present invention to provide an automatic feed control for maintaining constant weight on the bit at the bottom of the hole, which is responsive directly to the suspended weight and which operates with a high degree of sensitivity to small changes in the suspended weight.

A further object is to provide a draw-works drive for a well drilling rig whereby the ratio of power transmission between the prime mover and the draw-works drum may be adjusted to the value necessary to utilize the full power output of the prime mover at each hoist of the drill stem.

A further object is to provide a draw-works drive of such character wherein an operator-controlled member may be moved to cause the draw-works drum to rotate in hoisting direction and wherein automatic means beyond the control of the operator acts to select the proper ratio of power transmission necessary to utilize the full power output of the prime mover for any given weight of drill stem.

It is also an object to provide a well drilling apparatus incorporating an automatic weight sensitive feed control for drilling, together with an automatic constant horsepower control for hoisting, wherein readily operable controls of a simple and reliable nature are provided for shifting operation of the apparatus between drilling and hoisting and vice-versa.

Further objects and advantages of the present invention will be apparent from the following description, reference being had to the accompanying drawings wherein a preferred form of the present invention is clearly shown.

In the drawings:

Fig. 7 is a vertical sectional view of a weight sensitive control element forming part of the present invention.

Fig. 8 is a cross section on line 8—8 of Fig. 4.

Fig. 9 is a fragmentary sectional view on line 9—9 of Fig. 4.

Figure 1:
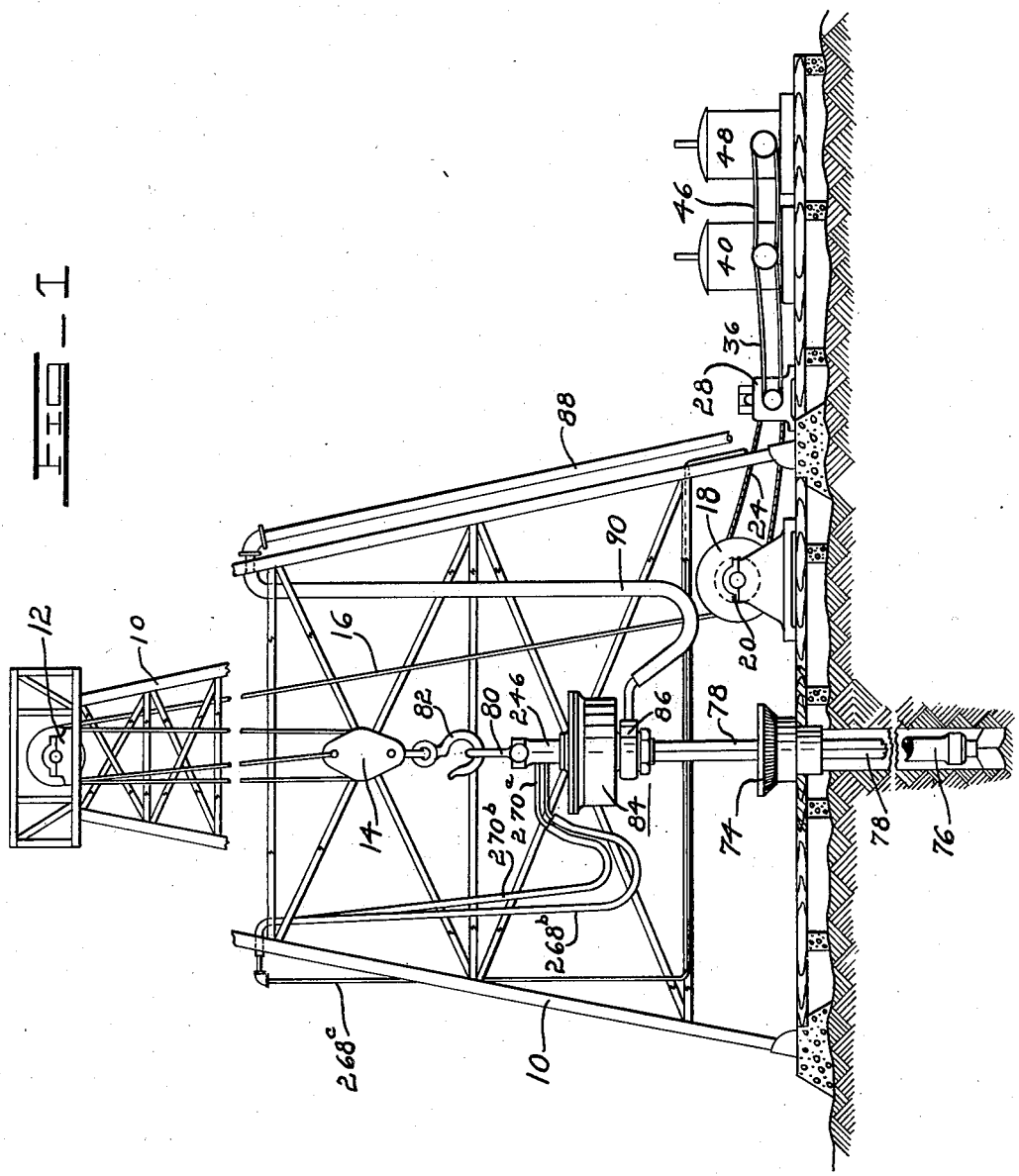
Fig. 1 is a side view of a well drilling apparatus partly in section showing a preferred form of the present invention.
Figure 2:
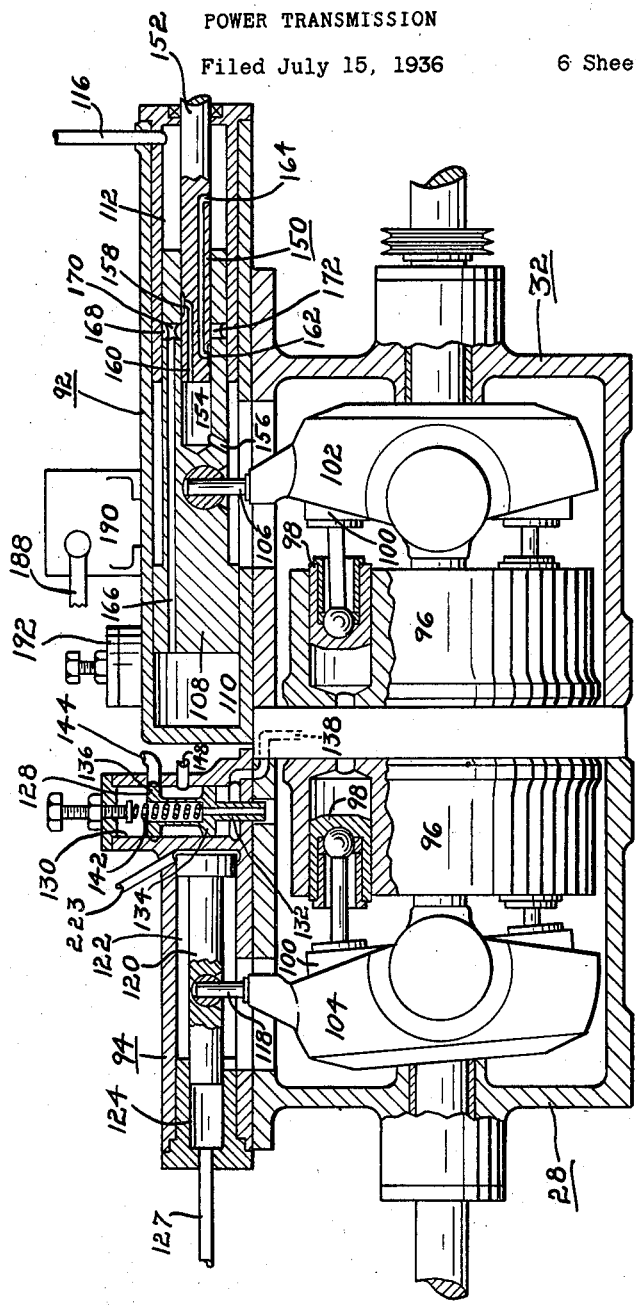
Fig. 2 is a cross section on line 2—2 of Fig. 3.
Figure 3:
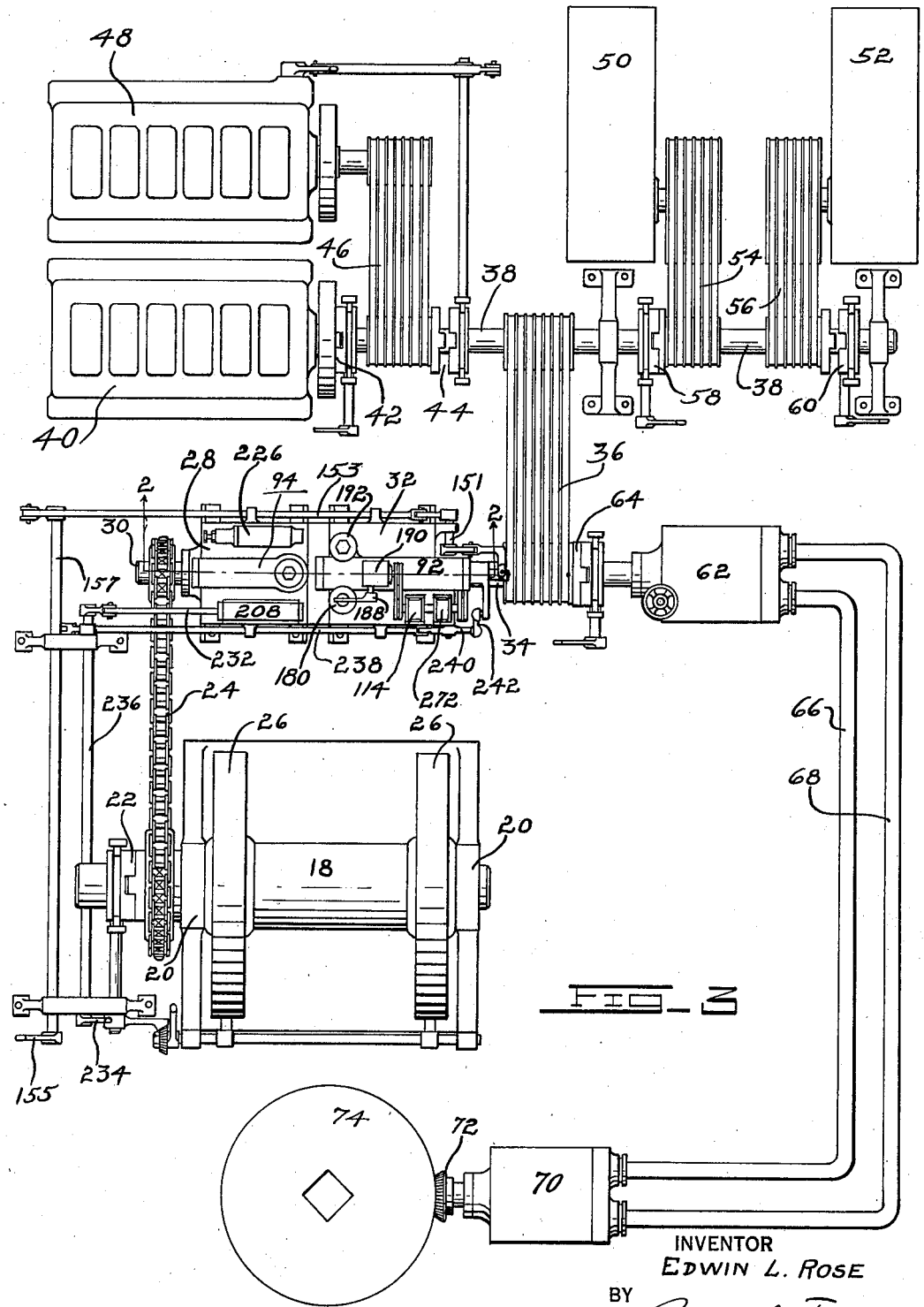
Fig. 3 is a plan view of the apparatus located on the derrick platform, illustrated in Fig. 1.

Referring now to Figures 1 and 3, there is illustrated a derrick 10 carrying a crown block 12 from which a traveling block 14 is suspended by a cable 16 having its live end wound on a draw-works drum 18. Drum 18 is mounted in bearing 20 and adapted to be driven through a jaw clutch 22 and a chain and sprocket drive 24. The draw-works may be provided with brake bands 26 and with the other usual accessory apparatus thereto, such as a cathead shaft etc., not illustrated. The draw-works preferably comprises but a single chain and sprocket drive 24 between the drum 18 and a fluid motor 28, having an output shaft 30 with which the chain and sprocket drive is directly connected. A fluid pump 32 is associated with the motor 28 in a manner to drive the same so that the pump and motor together comprise a variable speed hydraulic transmission. The pump 32 has an input shaft 34 on which is mounted a pulley forming part of a multiple belt drive 36 by which power is transmitted from a power shaft 38 to the pump shaft 34. The power shaft 38 is connected to the output shaft of a prime mover 40, for example a Diesel engine, through the medium of a jaw clutch 42 and is also adapted to be connected through a jaw clutch 44 to a multiple belt drive 46 by which the shaft 38 may be driven from a second Diesel engine prime mover 48. The shaft 38 is adapted to drive selectively either or both of a pair of slush pumps 50 and 52 through the medium of belt drives 54 and 56 and jaw clutches 58 and 60.

A second hydraulic pump 62 of the variable displacement type may be driven from the belt drive 36 through the medium of a jaw clutch 64 and is connected by conduits 66 and 68 to a fixed displacement fluid motor 70, which is directly connected to the bevel pinion 72 on a rotary drilling table 74. The table 74 drives a drill stem 76 through the medium of a kelly 78 which is suspended from the traveling block 14 by a bail 80 and hook 82. The top of the kelly 78 is provided with a hydraulic cylinder 84 forming a weight sensitive control element as well as a swivel and carries a swivel connection at 86 whereby mud may be circulated downwardly through the hollow kelly and drill stem to the cutting bit and returned around the outside of the stem to a mud reservoir from which mud is withdrawn by the two slush pumps 50 and 52 and delivered to the swivel 86 by the customary pipes 88 and flexible hose 90.

Referring now to Figures 2, and 4 to 9, the power transmission and control system therefor includes a stroke varying hydraulic motor 92 for the variable displacement pump 32 and a stroke varying hydraulic motor 94 for the variable displacement motor 28. The motor 28 and pump 32 are illustrated as of the "Waterbury" construction comprising revolving cylinder barrels 96 within which pistons 98 are reciprocated by the motion of socket rings 100 which revolve in tilting boxes 102 and 104.

The tilting box 102 carries a stud 106 having a pivoting and sliding connection with a differential piston 108 mounted in cylinder bores 110 and 112 of the hydraulic motor 92. The bore 112 is subjected to a constant fluid pressure from an auxiliary pump 114, through a conduit 116 while the bore 110 is subjected either to pressure from the pump 114 or to exhaust side pressure in accordance with the movement of certain control valves later to be described.

The tilting box 104 carries a stud 118 having a pivoting and sliding connection with a differential piston 120 reciprocable in bores 122 and 124 of the fluid motor 94. The bore 124 is subjected to constant pressure from the pump 114 through a conduit 127 while the bore 122 is subjected either to auxiliary pump pressure or to atmospheric pressure in accordance with the movements of a pressure responsive pilot valve 126 at certain times, and at other times is subjected constantly to auxiliary pump pressure.

Figure 4:
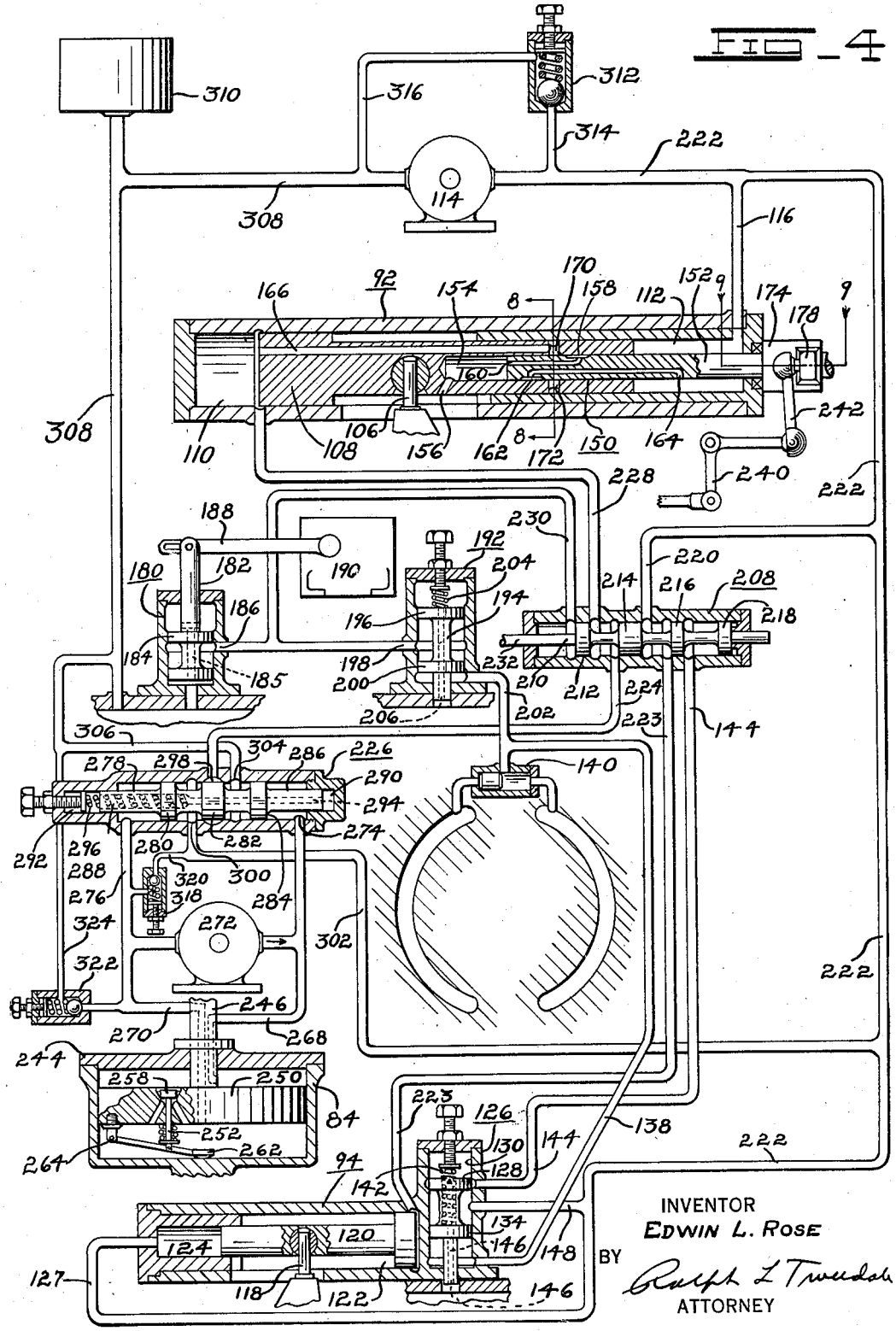
Fig. 4 is a diagrammatic view of the hydraulic circuits employed in the invention.
Figure 5:
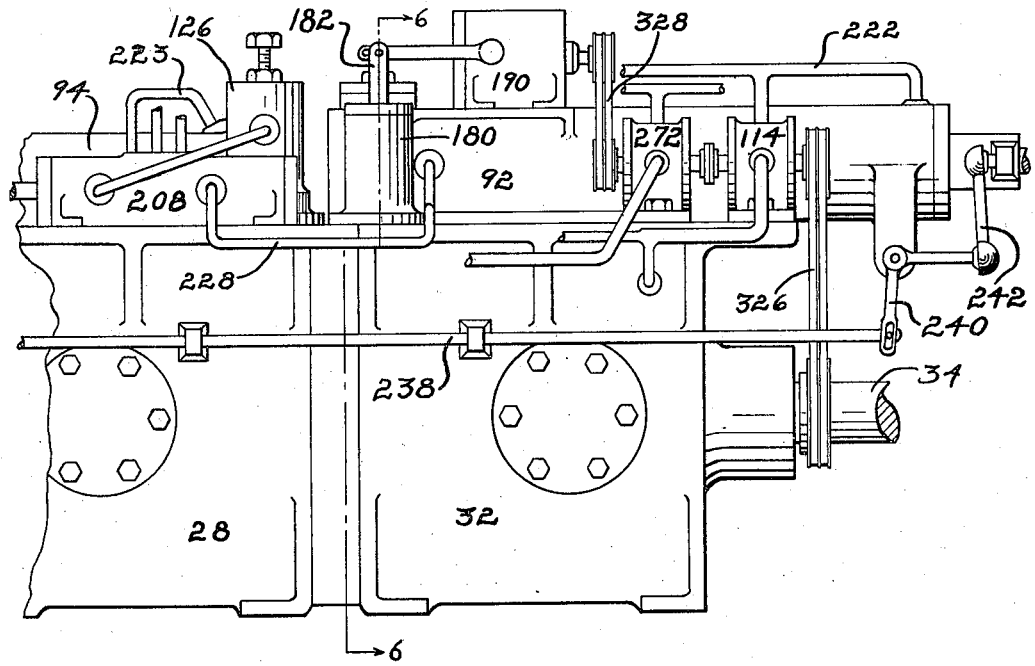
Fig. 5 is a fragmentary side view of a hydraulic power transmission forming part of the invention.
Figure 6:
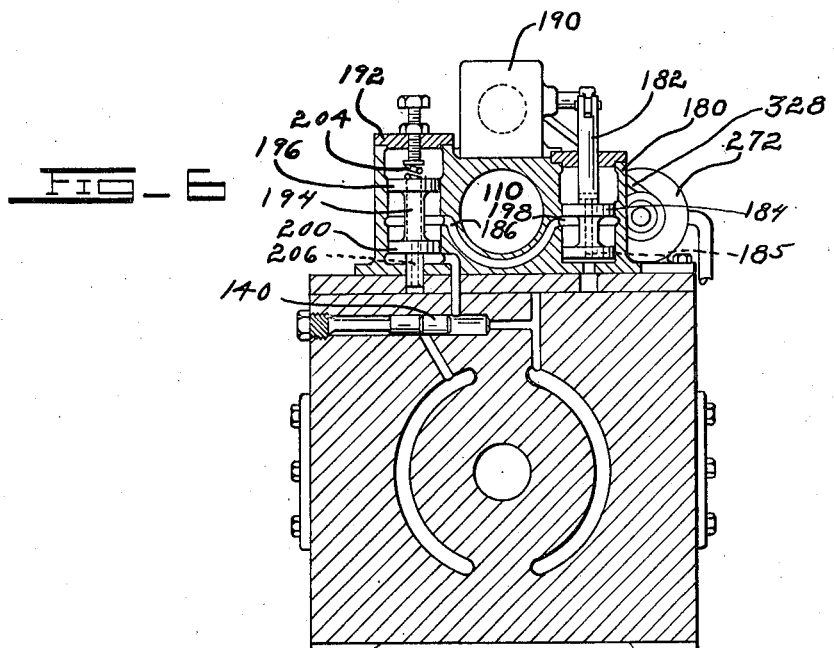
Fig. 6 is a cross section on line 6—6 of Fig. 5.

A movable valve member 128 of the pilot valve 126 is mounted in a bore 130 of the pilot valve 126 and has a reduced diameter stem 132 projecting through the bottom wall of the bore 130 and carries two piston heads 134 and 136. The lower end of the bore is in communication through a conduit 138 with the working circuit of the hydraulic transmission preferably through a shuttle valve 140 as indicated in Figure 4 whereby by the side of the working circuit which is of higher pressure at any instant is placed in communication with the lower end of the bore 130. An adjustable spring 142 urges the valve member 128 downwardly against the pressure exerted in the lower end of the bore 130. A conduit 144 is normally closed by the piston 136 and is opened to the exhaust side pressure at the interior of the case of the motor 28 through a passage 146 when valve member 128 moves downwardly while communication is established between conduit 144 and the auxiliary pump 114 through a conduit 148 when the valve member 128 is moved upwardly.

The fluid motor 92 is under the control of a manually operable follow-up valve 150 which comprises a plunger 152 slidable in a bore 154 formed in the small end of the piston 108. The bore 154 is in communication with the interior of the case of the pump 32 through a passage 156. The plunger 152 is formed with a groove 158 communicating with the bore 154 by a passage 160 and a groove 162 communicating with the cylinder bore 112 through a passage 164. The piston 108 is formed with a bore 166 leading from the cylinder 110 to a groove 168 (see Figure 8) which connects a radial bore 170 with a diametrically opposite radial bore 172. Longitudinal movement of the plunger 152 in either direction from the position illustrated thus opens a connection either from the cylinder bore 112 or from the bore 154 to the bore 166, leading to the cylinder 110 and thus causes movement of the piston 108 in a manner to follow up the movements of the plunger 152. The plunger 152 is controlled manually through a collar 147, a fork 149, bell crank 151, slide rod 153 and torsion rod 157 from a control handle 155, adjacent the driller's station.

Plunger 152 is adapted to be rotated angularly about its axis in order to move to grooves 158 and 162 out of register with the radial bores 170 and 172 as illustrated in Figure 8. For this purpose, a sleeve 174 is mounted adjacent the end of the cylinder 112, and is connected to the plunger 152 by a sliding key 176. An arm 178 on the sleeve 174 may be moved to rotate the sleeve 174 and plunger 152 as desired without affecting the longitudinal position of the plunger 152.

For the purpose of automatically controlling the tilting box 102 to maintain the horsepower delivered by the transmission at a constant maximum, certain valves are provided capable of predominating over the control exercised by the plunger 152. Referring now to Figure 4, a speed governor operated valve 180 is provided, having a movable member 182 provided with a piston head 184 for controlling the passage of fluid between a conduit 186 and the interior of the casing of the pump 32. The member 182 is operated by means of an arm 188 which is controlled by a speed governor 190 responsive to the speed of the shaft 34 of the pump 32. The arm lies in a downward position, illustrated, at normal pump speeds and moves upwardly whenever the pump speed falls below normal, to connect conduit 186 with the interior of the casing through a conduit 185. A pressure responsive valve 192 is also adapted to control communication between the cylinder 110 and the interior of the casing of the pump 32. This valve comprises a movable member 194 having a piston head 196 adapted to control communication between a conduit 198 and the interior of the casing of the pump 32. A piston head 200 is subjected to pressure from the shuttle valve 140 through a conduit 202 which is counteracted by an adjustable spring 204 so that when the pressure in either side of the working circuit rises beyond a predetermined safe value the valve member 194 rises to connect the conduit 198 with the interior of the casing of the pump 32 through a conduit 206.

A selector valve 208 is provided for manually transferring control between the automatic constant horsepower control used during hoisting of the drill stem from the well and the automatic constant weight control used while drilling. For this purpose the valve 208 is provided with a movable member 210 having pistons 212, 214, 216, and 218. A conduit 220 leads to the body of the valve 208 between the pistons 214 and 216 and is connected to the outlet line 222 of the auxiliary pump 114. A conduit 223 connects to the body of the valve 208 between the pistons 214 and 216 and leads to the cylinder 122 of the motor 94. Between the piston heads 216 and 218 the conduit 144 connects to the body of the valve 208. Between the piston heads 212 and 214, a conduit 224 connects to the body of the valve 208 and leads to a pilot control valve 226, later to be described. Between the heads 218 and 214 a conduit 228 connects to the valve body and leads to the cylinder 110 of the motor 92. To the left of the piston 212 a conduit 230 connects to the body of the valve 208 and leads to the conduits 186 and 198. A bore, not shown, is provided longitudinally through the center of the member 210 for connecting the extreme end spaces of the valve body together.

In the position of the valve illustrated in Figure 4, which is the position for constant weight control, the cylinder 122 is subjected to the outlet pressure of the pump 114 through the conduits 222, 220 and 223 and is cut off from the conduit 144 which is controlled by valve 126 by the piston head 216. The cylinder 110 is subjected to control by the pilot valve 226 through the conduits 228 and 224 while it is cut off from control by the speed responsive valve 180 and pressure responsive valve 192 by the piston head 212. The valve 208 is controlled from a stem 232 which is operated by a handle 234 adjacent the driller's station (see Figure 3) and a torsion rod 236. A control rod 238 is also connected to the rod 236 and operates a bell crank 240 which is connected by means of a link 242 to the arm 178 of the sleeve 174 so that when the valve 208 is moved into drilling position the sleeve 174 is turned to move the grooves 158 and 162 out of register with the bores 170 and 172. The passages 160 and 164 are somewhat smaller than the passages between cylinder 110 and the exhaust side of the system through valves 180 and 192 so that during constant horsepower operation, the valves 180 and 192 may predominate over the follow-up valve 150.

Referring to the mechanism for controlling the weight on the drilling bit, the cylinder 84, which is mounted at the top of the kelly 78, includes a cover 244 having a central bore through which a circular stem 246 may slide, which bore is sealed with a packing member 248. The stem 246 carries the bail 80 at its upper end and is provided with a piston 250 at its lower end having a fluid tight sliding fit in the interior bore of the cylinder 84. Piston 250 carries a valve 252 adapted to control the passage of fluid from the top to the bottom of the piston 250. For this purpose the piston is provided with a bore 254 having an enlarged portion 256, the bore 254 being adapted to receive a piston member 258 of the valve 252. Passages 260 extend from the bore 254 to the lower side of the piston 250.

The valve 252 is controlled in accordance with the position of the piston 250 relative to the cylinder 84 by means of a lever 262 pivoted at 264 and having a heel 266 adapted to rest on the bottom surface of the cylinder 84. A spring 267 constantly urges the valve 252 downwardly and holds the heel 266 against the bottom of the cylinder 84.

A conduit 268 is formed in the stem 246 to communicate with the space above the piston 250 and terminates in a pipe 268a which is connected by a flexible hose 268b to a pipe 268c. A conduit 270 extends from the lower face of the piston 250 through the stem 246 and terminates in a pipe 270a to which is connected a flexible hose 270b which connects with a pipe similar to the pipe 268c. The conduit 268 is connected to the outlet of a second auxiliary pump 272 and to a port 274 in the pilot valve 226. The conduit 270 is connected to the inlet of auxiliary pump 272 and to a port 276 in the pilot valve 226. The pilot valve 220 has a movable member 278 having piston heads 280, 282, and 284 and is formed with cylindrical end portions 286 and 288 receivable in bores 290 and 292 of the valve housing. A conduit 294 extends through the movable member 278 to connect the bores 290 and 292. An adjustable spring 296 yieldingly urges the valve member 278 to the right. The position of the movable member 278 is then determined by the difference in pressure between the conduits 268 and 270 which in turn is determined by the pressure drop across the valve 252.

The piston 282, when the member 278 is in mid-position is adapted to close a port 298 communicating with the conduit 224 leading from the selector valve 208. When the valve is moved to the right, in Figure 4, communication is opened between the port 298 and a port 300 which is connected to a conduit 302 leading from the discharge conduit 222 of the auxiliary pump 114. When the valve member 278 is moved to the left communication is established between the port 298 and a port 304 communicating with a conduit 306 which leads to the return conduit 308 for the auxiliary pump 114. The conduit 308 is in communication with the usual expansion tank 310 which is also connected by conduits, not shown, with the interior of the casings of the motor 28 and the pump 32.

A relief valve 312 connects by conduits 314 and 316 with the outlet and the inlet of the pump 114 for the purpose of limiting the pressure developed in the conduit 222. A relief valve 318 is interposed in a conduit 320 leading from the conduit 302 to the conduit 270 for the purpose of replenishing fluid in the system fed by the auxiliary pump 272. The valve 318 may be set so that a predetermined drop in pressure in the low pressure conduit 270 permits fluid to pass from the conduit 302 to the conduit 270 until the pressure in the latter rises to normal operating value. A relief valve 322 is also provided in a conduit 324 leading between the conduit 270 and the return conduit 308 for the auxiliary pump 114. The valve 322 is preferably set to open at a predetermined pressure rise above normal in the low pressure conduit 270. Conveniently the conduit 270 may be maintained at a range of pressures between atmospheric and 25 lbs. per sq. in. thereabove. Thus the valve 322 would be set to relieve at 25 lbs. per sq. in. while the valve 318 would be set to relieve at the same value at which valve 312 is set. The auxiliary pumps 114 and 272 may be driven from the shaft 34 by a belt drive 326 while a belt drive 328 operates the speed governor 190.

In operation of the device when it is desired to hoist the drill stem, clutches 42 and 44 will be engaged so that the prime movers 40 and 48 are compounded together. The clutches 58 and 60 are disconnected, as is the clutch 64. With clutch 22 engaged and selector valve 208 moved to the left hand position, in Figure 4, in which sleeve 174 holds the grooves 158 and 162 in register with the bores 170 and 172, the speed of hoisting may be controlled by the operating handle 155. Thus if this handle is moved to move the plunger 152 to the right, Figures 2 and 4, fluid will be admitted to the cylinder 110 from pump 114 through the conduits 222, and 116, cylinder 112, conduit 164, groove 162, bore 172, groove 168 and bore 166. The piston 108 will thereby move to the right by the same distance that the plunger 152 was moved to the right and the tilting box 102 will be moved into stroke in a direction causing the hoist drum 18 to wind cable thereon and lift the drill string. Conveniently the handle 155 may be thrown to its limit so that the tilting box 102 will be moved into full stroke if the weight of the drill string is such as to permit hoisting at this speed. Considering the operation with a maximum weight of drill string in the well the speed of hoisting is determined solely by the speed responsive valve 180. As soon as the tilting box 102 begins to move into stroke, pressure is created in the high pressure valve port of the hydraulic transmission which is transmitted through conduit 138 to the valve 126. As soon as this pressure reaches a predetermined point, of example 500 lbs. per sq. in., valve member 128 lifts, permitting fluid from the auxiliary pump 114 to flow through conduits 222, 148 and 144, valve 208 and conduit 223 to the cylinder 122, thus moving the piston 120 to the left and placing the tilting box 104 in full stroke position. As the piston 108 continues to move to the right a point is reached where the speed of hoisting is such that the maximum horsepower of the prime movers 40 and 48 is utilized. Any movement of the tilting box 102 beyond this point causes the prime movers to fall off in speed which accordingly operates the speed governor 190 to lift the valve 180. As soon as valve 180 lifts the cylinder 110 is opened to the exhaust side of the system through conduits 228, valve 208, conduits 230 and 186, valve 180 and conduit 185. Movement of the tilting box 102 is therefore prevented beyond a position at which the speed of hoisting is such as to use the full horsepower of the prime movers 40 and 48.

As the weight of the drilling stem is gradually decreased by progressive removal of sections thereof, the tilting box 102 moves further toward full stroke position at each time the plunger 152 is operated to hoist. When the weight of the stem decreases sufficiently so that the tilting box 102 can move into full stroke position without slowing down the prime movers 40 and 48 the transmission operates at one to one ratio until a further decrease in the weight of the stem permits the valve 126 to drop thus opening the cylinder 122 to the exhaust side of the system through conduit 223, valve 208, conduit 144, valve 126 and conduit 146. The piston 120 thereby moves to the right until the stroke of the motor 28 has decreased sufficiently to maintain the pressure at which the valve 126 is set. The hoisting speed is thereby increased to the point where the full power of the prime movers 40 and 48 is utilized. As the weight of the stem further decreases the stroke of the motor 28 is correspondingly decreased until the minimum stroke is reached at the point where the last strand of drill stem is removed from the string.

The drill string may be fed into the hole again as sections are added thereto by releasing the clutch 122 and permitting the drill string to fall of its own weight in the usual manner. When the drill string has been completely fed into the hole, drilling may be resumed by operating the handle 234 to shift the selector valve 208 and the sleeve 174 into drilling position. Under these conditions the auxiliary pump 272 delivers fluid through the conduit 268 through the upper chamber of the cylinder 84. The pressure maintained in this chamber is determined by the setting of the spring 296 which may be adjusted to maintain any desired proportion of the total weight of the drill stem suspended from the traveling block 14. The clutch 64 and one or both of the clutches 58 or 60 being engaged, mud is circulated and the rotary table is caused to revolve by the hydraulic transmission 62—70. As drilling proceeds the drill stem is fed downwardly as required to maintain the weight on the drilling bit constant. Thus as the drill "makes hole" the resulting small increase in the weight suspended on the travel block 14 tends to pull the cylinder 84 downwardly thus tending to close the valve 252 and increase the pressure above the piston 250. The valve member 278 is thereby moved to the left permitting fluid to flow from the cylinder 110 through conduit 228, valve 208, conduit 224, port 298, port 304, conduit 306 and conduit 308 to the exhaust side of the system. The piston 108 is thereby moved to the left to move the tilting box 102 slightly into stroke in the lowering direction until the desired weight is again maintained on the drilling bit. During normal operation the mechanism tends to reach a state of equilibrium with tilting box 102 in a slight stroke in the lowering direction such that the drill is fed downwardly at the same rate at which the bit "makes hole". Should the drill be fed downwardly too rapidly the cylinder 84 will tend to rise, thus opening the valve 252 wider and permitting valve member 278 to move to the right. Fluid from the auxiliary pump 114 is thus permitted to pass through the conduits 222 and 302, port 300, port 298, conduit 224, valve 208 and conduit 228 to the cylinder 110. The rate of feed is thus adjusted to correspond to the rate at which the bit "makes hole" and the weight supported from the travelling block is thus maintained constant.

While the form of embodiment of the invention as herein disclosed, constitutes a preferred form, it is to be understood that other forms might be adopted, all coming within the scope of the claims which follow.

What is claimed is as follows:

1. In a well drilling rig the combination with a tool string of a drum, a prime mover, a variable displacement pump driven by the prime mover, a fluid motor hydraulically connected to the pump and mechanically connected to the drum, a cable having one end wound on the drum and adapted to support the tool string, and means responsive to the weight supported by the cable for controlling the displacement of the pump to maintain the force of the tool string against the earth substantially constant.

2. In a well drilling rig the combination with a tool string of a drum, a prime mover, a variable displacement pump driven by the prime mover, a fluid motor hydraulically connected to the pump and mechanically connected to the drum, a cable having one end wound on the drum and adapted to support the tool string, and means including an expansible chamber for fluid under a pressure responsive to the weight supported by the cable for controlling the displacement of the pump to maintain the force of the tool string against the earth substantially constant.

3. In a well drilling rig the combination with a tool string of a drum, a prime mover, a variable displacement pump driven by the prime mover, a fluid motor hydraulically connected to the pump and mechanically connected to the drum, a cable having one end wound on the drum, and adapted to support the tool string, and means including an expansible chamber for fluid under a pressure responsive to the weight supported by the cable interposed between the cable and the tool for controlling the displacement of the pump to maintain the force of the tool string against the earth substantially constant.

4. In a well drilling rig the combination with a tool string of a drum, a prime mover, a variable displacement pump driven by the prime mover, a fluid motor hydraulically connected to the pump and mechanically connected to the drum, a cable having one end wound on the drum and adapted to support the tool string, means including an expansible chamber for fluid under a pressure responsive to the weight supported by the cable interposed between the cable and the tool, a pump for maintaining pressure in said chamber, a valve responsive to expansion and contraction of said chamber for controlling the return of fluid to the second mentioned pump, and means responsive to the pressure maintained in said chamber for controlling the displacement of the first mentioned pump to maintain the force of the tool string against the earth substantially constant.

5. In a draw-works drive for a well drilling rig the combination with a tool string of a prime mover, a draw-works drum, a variable displacement pump driven by the prime mover, a fluid motor hydraulically connected to the pump and mechanically connected to the drum, manually operable means for controlling the displacement of the pump to hoist and lower the tool string, automatically operating means to control the displacement of the pump for feeding the tool string downwardly as drilling progresses and manually shiftable means for selectively rendering either of said means operative and the other inoperative to control the pump displacement.

6. In a draw-works drive for a well drilling rig the combination with a tool string of a prime mover, a draw-works drum, a variable displacement pump driven by the prime mover, a fluid motor hydraulically connected to the pump and mechanically connected to the drum, manually operable means for controlling the displacement of the pump to hoist and lower the tool string, means responsive to the suspended weight of the drill tool to control the displacement of the pump for feeding the tool string downwardly as drilling progresses and manually shiftable means for selectively rendering either of said means operative and the other inoperative to control the pump displacement.

7. In a draw-works drive for a well drilling rig the combination with a tool string of a prime mover, a draw-works drum, a variable displacement pump driven by the prime mover, a fluid motor hydraulically connected to the pump and mechanically connected to the drum, manually operable means for controlling the displacement of the pump to hoist and lower the tool string, automatically operating means to control the displacement of the pump for feeding the tool string downwardly as drilling progresses, manually shiftable means for selectively rendering either of said means operative and the other inoperative to control the pump displacement, and means effective during manually controlled operation to limit the hoisting speed to a value such that the maximum power capacity of the prime mover is not exceeded.

8. In a draw-works drive for a well drilling rig the combination with a tool string of a prime mover, a draw-works drum, a variable displacement pump driven by the prime mover, a fluid motor hydraulically connected to the pump and mechanically connected to the drum, manually operable means for controlling the displacement of the pump to hoist and lower the tool string, means responsive to the suspended weight of the drill tool to control the displacement of the pump for feeding the tool string downwardly as drilling progresses, manually shiftable means for selectively rendering either of said means operative and the other inoperative to control the pump displacement, and means effective during manually controlled operation to limit the hoisting speed to a value such that the maximum power capacity of the prime mover is not exceeded.

9. In a draw-works drive for a well drilling rig the combination of a prime mover, a draw-works drum, a fluid pump driven by the prime mover, a fluid motor driven by the pump and driving the draw-works drum, operator controlled means including a follow-up servo-motor for controlling the delivery of fluid to the motor, and means beyond the control of the operator and automatically operative to control the motor displacement to maintain a constant power load on the prime mover over a predetermined range of loads on the drum.

10. In a draw-works drive for a well drilling rig the combination of a prime mover, a draw-works drum, a fluid pump driven by the prime mover, a fluid motor driven by the pump and driving the draw-works drum, manual control means for varying the delivery of fluid to the motor to cause the drum to rotate at any desired speed, and a constant horsepower control means for varying the delivery of fluid to the motor, the two control means being interconnected so that the manual control means is exclusively effective at speeds below a predetermined horsepower applied to the drum and the other control means is exclusively effective when the manual control means is moved to a position calling for a greater speed.

11. In a draw-works drive for a well drilling rig the combination of a prime mover, a draw-works drum, a fluid pump driven by the prime mover, a fluid motor driven by the pump and driving the draw-works drum, manual control means for varying the delivery of fluid to the motor to cause the drum to rotate at any desired speed, and a constant horsepower control means for varying the delivery of fluid to the motor, the two control means being interconnected so that the manual control means is exclusively effective at speeds below a predetermined horsepower applied to the drum and the other control means is exclusively effective when the manual control means is moved to a position calling for a greater speed, one of said control means operating to vary the displacement of the pump.

EDWIN L. ROSE.